US 007808715B2

(12) United States Patent
Hsieh (10) Patent No.: US 7,808,715 B2
(45) Date of Patent: Oct. 5, 2010

(54) MICHELSON-INTERFEROMETER-BASED DELAY-LINE INTERFEROMETERS

(75) Inventor: Yung-Chieh Hsieh, San Jose, CA (US)

(73) Assignee: Optoplex Corporation, Fremont, CA (US)

( * ) Notice: Subject to any disclaimer, the term of this patent is extended or adjusted under 35 U.S.C. 154(b) by 0 days.

(21) Appl. No.: 12/401,616

(22) Filed: Mar. 11, 2009

(65) Prior Publication Data

US 2009/0213468 A1 Aug. 27, 2009

Related U.S. Application Data

(62) Division of application No. 11/485,653, filed on Jul. 11, 2006, now Pat. No. 7,522,343.

(60) Provisional application No. 60/698,584, filed on Jul. 11, 2005.

(51) Int. Cl.
*G02B 27/14* (2006.01)
*G01B 9/02* (2006.01)

(52) U.S. Cl. ............... 359/634; 359/629; 356/450

(58) Field of Classification Search ......... 359/627–634, 359/577–579, 288, 325; 398/159, 141, 158, 398/202, 208, 212; 356/450–521
See application file for complete search history.

(56) References Cited

U.S. PATENT DOCUMENTS

| 6,594,055 | B2 | 7/2003 | Snaverdt |
| 2004/0263990 | A1* | 12/2004 | Hsieh ........................ 359/634 |
| 2005/0058394 | A1* | 3/2005 | Conway et al. ............... 385/27 |

* cited by examiner

*Primary Examiner*—Mohammed Hasan
(74) *Attorney, Agent, or Firm*—Antonio R. Durando (57) ABSTRACT

An interferometer includes a means for splitting, at a splitting location, an input light beam into a first beam and a second beam; and means for recombining, at a recombination location, the first beam and the second beam. The interferometer is designed such that the first beam will travel a first optical path length (OPL) from the splitting location to the recombination location, and the second beam will travel a second OPL from the splitting location to the recombination location and such that when the input light beam has been modulated at a data rate comprising a time interval, then the difference in optical path lengths between the first OPL and the second OPL is about equal to the time interval multiplied by the speed of light.

13 Claims, 6 Drawing Sheets

FIG. 8   SPACER   82   80

FIG. 9   94   SPACER   96   HR   AR 90   AR 92   HR

FIG. 10   100   102   SPACER

MICHELSON-INTERFEROMETER-BASED DELAY-LINE INTERFEROMETERS

RELATED APPLICATIONS

This application is a divisional application of U.S. Ser. No. 11/485,653, filed Jul. 11, 2006, entitled Michelson Interferometer Based Delay Line Interferometers, which claimed the priority to U.S. Provisional Patent Application Ser. No. 60/698,584, filed Jul. 11, 2005, entitled: "Integration of Michelson Differential Phase Shift Keying (DPSK) Demodulator with Photo Detector."

BACKGROUND OF THE INVENTION

1. Field of the Invention

The present invention relates to differential phase-shift keying (DPSK) in telecommunication, and more specifically, it relates to methods in DPSK for converting a phase-keyed signal to an intensity-keyed signal.

2. Description of Related Art

Phase-shift keying (PSK) is a digital modulation scheme that conveys data by changing, or modulating, the phase of a reference signal (the carrier wave). Any digital modulation scheme uses a finite number of distinct signals to represent digital data. In the case of PSK, a finite number of phases are used. Each of these phases is assigned a unique pattern of binary bits. Usually, each phase encodes an equal number of bits. Each pattern of bits forms the symbol that is represented by the particular phase. The demodulator, which is designed specifically for the symbol-set used by the modulator, determines the phase of the received signal and maps it back to the symbol it represents, thus recovering the original data. This requires the receiver to be able to compare the phase of the received signal to a reference signal—such a system is termed coherent.

Alternatively, instead of using the bit patterns to set the phase of the wave, it can instead be used to change it by a specified amount. The demodulator then determines the changes in the phase of the received signal rather than the phase itself. Since this scheme depends on the difference between successive phases, it is termed differential phase-shift keying (DPSK). DPSK can be significantly simpler to implement than ordinary PSK since there is no need for the demodulator to have a copy of the reference signal to determine the exact phase of the received signal (it is a non-coherent scheme).

In telecommunication technology, differential phase-shift keying (DPSK) requires a decoding method in order to convert the phase-keyed signal to an intensity-keyed signal at the receiving end. The decoding method can be achieved by comparing the phase of two sequential bits. In principle, it splits the input signal beam into two channels with a small delay before recombining them. After the recombination, the beams from the two channels interfere constructively or destructively. The interference intensity is measured and becomes the intensity-keyed signal. To achieve this, one channel has an optical path longer than the other one by a distance equivalent to the photon flight time of one bit. For instance: in a 40 Gbit per second system, one bit is equal to 25 ps, and light travels 7.5 mm in that period. In this example, the optical path difference (OPD) between, the two channels is 7.5 mm, The Mach-Zehnder type interferometer with a desired OPD between the two channels is currently used for decoding purposes. Because of the properties of optical interference, a change in OPD can greatly affect interference intensity. Moreover, the optical path in each arm is much longer than its difference. Therefore, a sophisticated temperature control is required to maintain the optical path in each arm in order to assure that the change in the OPD is much less than a small fraction of one wavelength, e.g., ~10 nm. This is difficult and expensive, especially for an interferometer with a long optical path.

SUMMARY OF THE INVENTION

It is an object of the present invention to provide a DPSK demodulator that determines the changes in the phase of a received signal (i.e., the difference between successive phases).

It is another object to use various disclosed embodiments of novel Michelson type interferometers as DPSK demodulators to determine the changes in the phase of a received signal.

These and other objects will be apparent based on the disclosure herein.

The invention is various embodiments of novel Michelson type interferometers used as DPSK demodulators to determine the changes in the phase of a received signal. In the demodulator, the input beam is split into two portions at the beam splitter. The two beams travel a different path and are returned by their corresponding reflector. Because the OPL's are different, the two returned beams have a time delay with respect to each other. The difference between the two OPL's is designed to assure that the delay is approximately equal to the time delay of any two successive bite or data symbols.

A general embodiment of the invention is a Michelson type interferometer that includes a means for splitting, at a splitting location, an input light beam into a first beam and a second beam; and means for recombining, at a recombination location, the first beam and the second beam. The interferometer is designed such that the first beam will travel a first optical path length (OPL) from the splitting location to the recombination location, and the second beam will travel a second OPL from the splitting location to the recombination location and such that when the input light beam has been modulated at a data rate comprising a time interval, then the difference in optical path lengths between the first OPL and the second OPL is about equal to the time interval multiplied by the speed of light.

In specific embodiments of the interferometer, the means for recombining can comprise a first reflector positioned to reflect the first beam, and the means for recombining can further comprise a second reflector positioned to reflect the second beam. In this embodiment, one of the reflectors is separated from the splitting location by a distance sufficient to make the difference in optical path lengths between the first OPL and the second OPL to be about equal to the time interval multiplied by the speed of light. The separation of the reflector can be accomplished with at least one spacer that can have either a low or a high coefficient of thermal expansion (CTE). In another embodiment, the separated reflector is fixedly attached to means for adjusting the distance.

The invention also contemplates methods of using the different embodiments of interferometers described herein. A general embodiment of the method includes the steps of providing an input light beam modulated at a data rate comprising a time interval; splitting, at a splitting location, said input light beam into a first beam and a second beam; and recombining, at a recombination location, said first beam and said second beam, wherein said first beam travels a first optical path length (OPL) from said splitting location to said recombination location, wherein said second beam travels a second OPL from said splitting location to said recombination location, wherein the difference in optical path lengths between said first OPL and said second OPL is about equal to said time interval multiplied by the speed of light.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
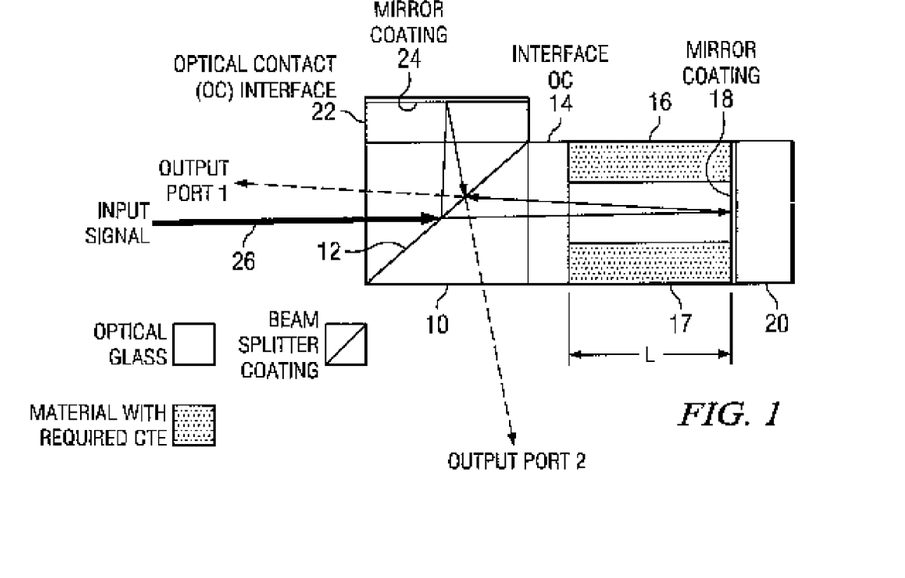
FIG. 1 illustrates a Michelson-based delay line interferometer.

An embodiment of the present invention is illustrated in FIG. 1, which shows a Michelson-based delay line interferometer (DLI) formed by a beamsplitter 10 with beam splitting coating 12. An optical glass element 14 is affixed to the right hand side of the beamsplitter. Element 14 can be affixed, e.g., with an index matching adhesive as known in the art. Spacers 16 and 17, having a length L, and made of a material having a low coefficient of thermal expansion (CTE), are affixed to the right hand side of the optical element 14. To the right hand side of the spacers is a mirror coating 18 on a substrate 20. A second optical glass element 22 is affixed to the top of beamsplitter 10. A mirror (reflective) coating 24 is located on the second surface of element 22. When elements 14 and 22 are of the same material and thickness, the round-trip optical path length difference (OPD) between mirror coating 18 and mirror coating 24 is 2 times L, where L is the length of the spacer 16. The input signal 26 is impingent on the left-hand side of the beamsplitter. Beamsplitting coating 12 splits the light into two beams and each beam carries about 50% of the total power. After each beam is reflected by its corresponding mirror, it hits the beamsplitter in its respective return path, and therefore two beams are split into 4 beams. Interference occurs in both the leftward and the downward beams to form the two output beams of the DLI. The relationship between the free-spectral-range (FSR) and OPD is:

$$FSR = \frac{C}{(OPD)}.$$

where C is the speed of light. To make the DLI spectrum to not change with temperature, the CTE of the material that is used for the spacer(s) has to be extremely small. Materials like Zerodur or ULE, e.g., can be used. Both materials have a CTE that is about 0.05 ppm.

A second embodiment that can be understood with reference to FIG. 1 is a thermally tunable DLI. To make the spectrum of the DLI tunable, the material used for the spacers 16 and 17 should have an appropriately high CTE such that when the temperature changes, the OPD will increase or decrease. It turns out that the spectrum of the DLI shifts accordingly. The temperature of the DLI can be adjusted with a thermal electric cooler (TEC) or with a heater.

Figure 2:
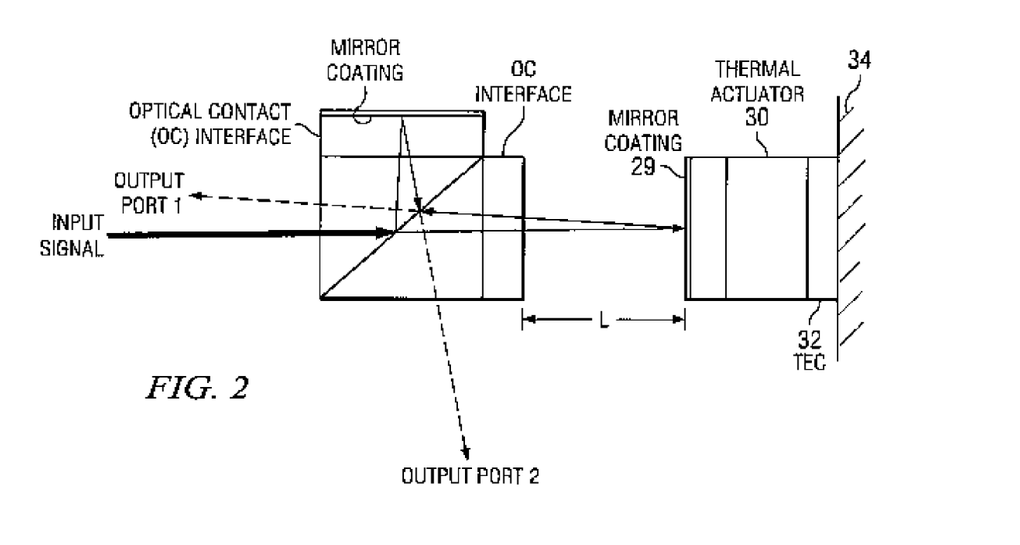
FIG. 2 shows a high speed thermally tuned DLI.

FIG. 2 shows another type of thermally tuned DLI. In this case, a mirror substrate 28 (between the mirror coating 29 and the actuator) with a mirror coating 29 is mounted on a thermal actuator 30. The thermal actuator is a material with an appropriate CTE. The TEC 32 is used to provide the heat to or remove the heat from the actuator to adjust the temperature. As shown in FIG. 2, the left hand side of the TEC is connected to the actuator and its right hand side contacts to a heat sink 34. When the temperature of the actuator increases, the thermal expansion moves the mirror to the left hand side. For a given temperature change, to maximize the movement, the CTE of the actuator has to be large. Moreover, the response time of this device is determined by how long the heat takes to propagate across the actuator. Therefore, to minimize the response time, a material of high thermal conductivity, e.g., Aluminum or Copper is recommended. One can use Aluminum Nitride with a mirror coating on it to replace the combinational function of the mirror substrate 28 and the actuator 30, because it has high thermal conductivity, low CTE and excellent surface quality.

The DLI of FIG. 2 has much higher tuning speed and low power consumption than the tunable embodiment of FIG. 1 in which the whole piece of glass must be heated or cooled to tune the spectrum.

Figure 3:
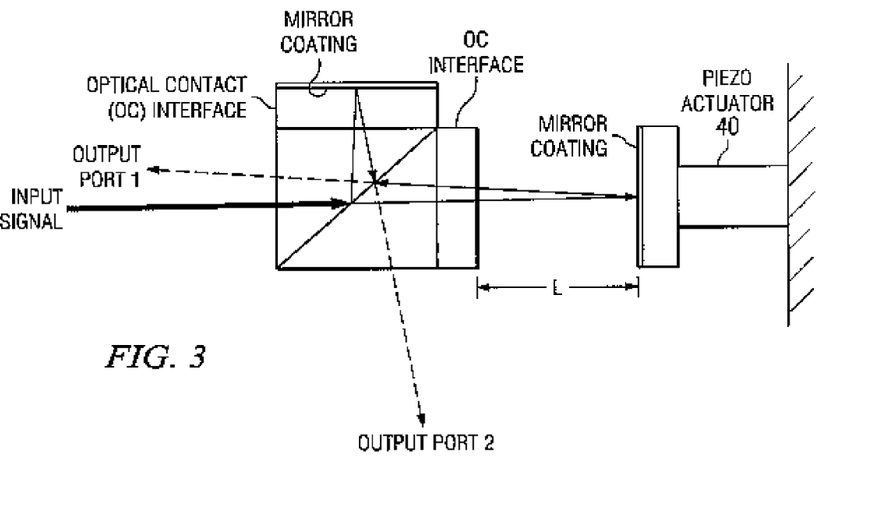
FIG. 3 shows a piezo tuned tunable DLI.

FIG. 3 shows a Piezo tuned DLI. The right mirror is mounted to a Piezo actuator 40. When a voltage is applied across the actuator, the length of the actuator varies according to the magnitude of applied voltage. The frequency response of the device can be easily higher than one KHz. The advantage of this approach is in its high speed and low power consumption.

Figure 4:
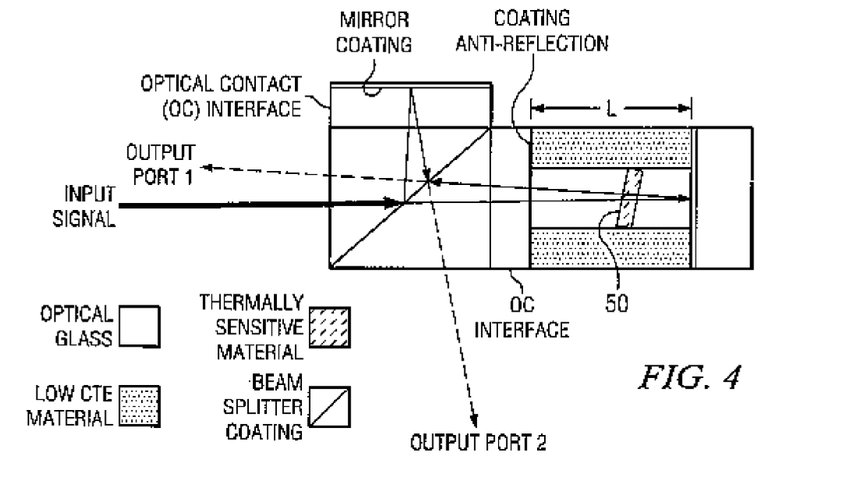
FIG. 4 shows a Michelson-based delay line interferometer that includes a thermally tuned phase modulator inserted in the optical path.

FIG. 4 shows a DLI whose structure is similar to the device shown in FIG. 1. In this case, there is a thermally tuned phase modulator 50 inserted in the optical path and the temperature of the phase modulator can be adjusted by a TEC or by heat, which is not shown in the diagram. Spacers of this device are low CTE material. The only thermally sensitive part is the phase modulation window inserted in the optical path. The window material should be optically transparent and the g-factor is a function of temperature.

Assuming that the index and thickness of the phase modulator are n and $L_o$ respectively, the single trip optical path length is $$OPL = L + (n-1)L_o.$$

When the temperature changes, the OPL variation is:

$$\frac{d[OPL]}{dT} = \frac{dL}{dT} + (n-1)\frac{dL_0}{dT} + L_0\frac{dn}{dT}$$
$$= 0 + L_0\left[(n-1)\alpha + \frac{dn}{dT}\right]$$
$$= L_0 g$$

-continued where $$g = \left[(n-1)\alpha + \frac{dn}{dT}\right],$$

where α is the coefficient of thermal expansion of the phase modulator. In the deviation, it has assumed that the spacer material has zero thermal expansion, i.e., dL/dT=0. The g-factor is a material property. For fused silica glass and Silicon, the g-factor is about 10 ppm/deg-C. and 200 ppm/deg-C. respectively. If the material is silicon, with a thickness of 100 μm, one can change the OPL by 20 nm with one degree of temperature change.

Figure 5:
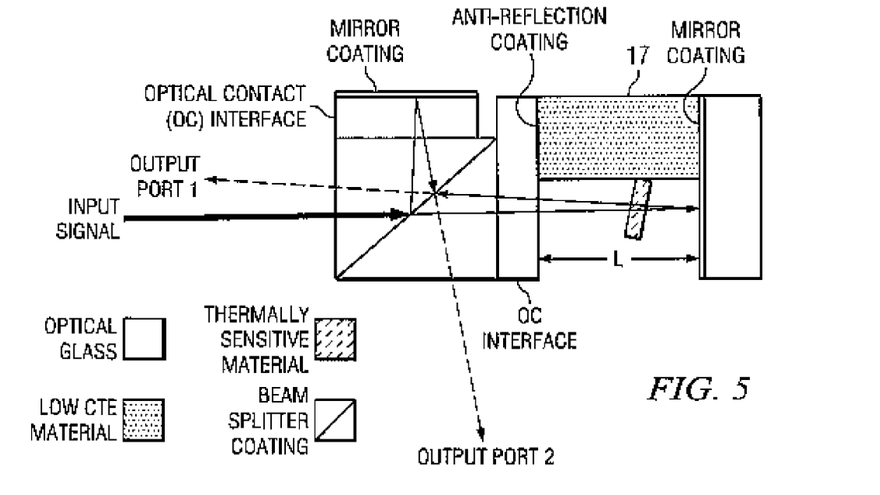
FIG. 5 shows a single-spacer Michelson-based delay line interferometer.

The embodiment of FIG. 4 has lower power consumption and a higher tuning speed than those of the tunable embodiment of FIG. 1. The TEC/heat is only applied to a thin piece of phase modulation window 50, rather than the entire spacer. FIG. 5 shows a single-spacer (17) Michelson-based delay line interferometer. The phase modulation window can be used to provide tunability when configured as taught in U.S. Pat. No. 6,816,315, which is incorporated herein by reference.

The polarization dependent property of a Michelson DLI is determined by the beam splitter coating. In order to minimize the PDF (polarization dependent frequency shift), the coating on the beam splitter should have minimized polarization dependent phase (PDP). To achieve this, the coating has to be symmetrical. See U.S. Pat. No. 6,587,204, incorporated herein by reference and U.S. patent application Ser. No. 10/796,512, incorporated herein by reference.

Figure 6:
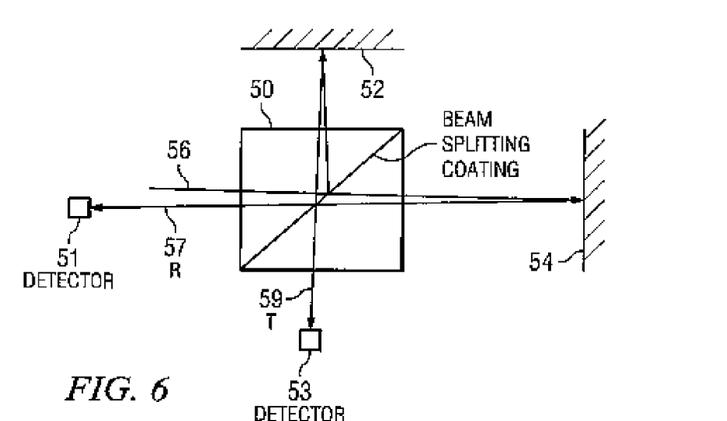
FIG. 6 shows a prior art Michelson interferometer, with two detectors located at a specific distance.

It is well known that a Michelson interferometer includes one beamsplitter 50 and two mirrors 52 and 54, as shown in FIG. 6. When light 56 is provided from a coherent light source (such as a laser), the interference intensity can be described as $$I = A + B\cos(4\pi L\upsilon/C),$$

where C is the speed of light, υ is the optical frequency of the light source, A and B are two constants determined by the two mirrors and the beam splitter, and L equals one half of the OPD between the two arms. For a given υ, the interference intensity is a function of L. The challenge is to hold the two mirrors steadily, i.e., to less than a fraction of one wavelength, over a temperature range from −5 to 70 degree C. The two beams reflected by the two mirrors interfere at the beam splitter, constructively or destructively, and form two output beams, 57 and 59 in FIG. 6. The interference intensities of these two output beams are complementary. One should also note that the time of flight from the beamsplitter coating to the corresponding detectors (51 and 53) is important. The time difference between them should be much less than the duration of one bit. For use in DQPSK embodiments, the invention is designed to identify phase changes of 0, 90, 180 and 270 degrees.

Figure 7:
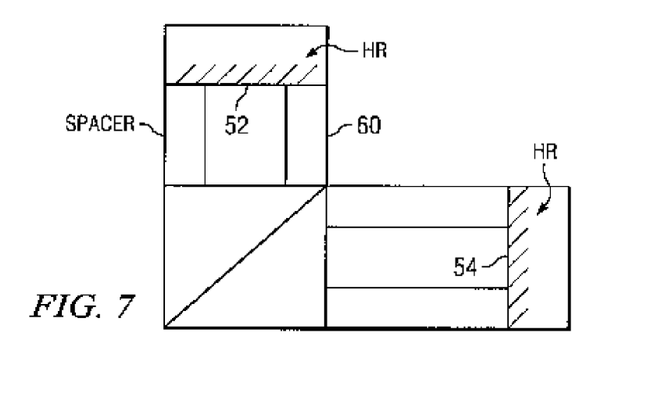
FIG. 7 illustrates the use of a zero thermal expansion material as a spacer to minimize the change in OPD.
Figure 8:
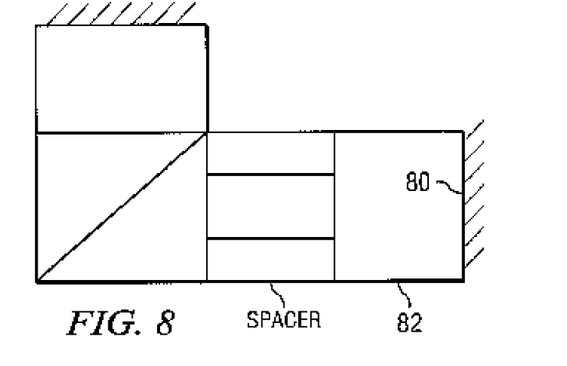
FIG. 8 shows a Michelson-based delay line interferometer with a second surface mirror in both paths.
Figure 9:
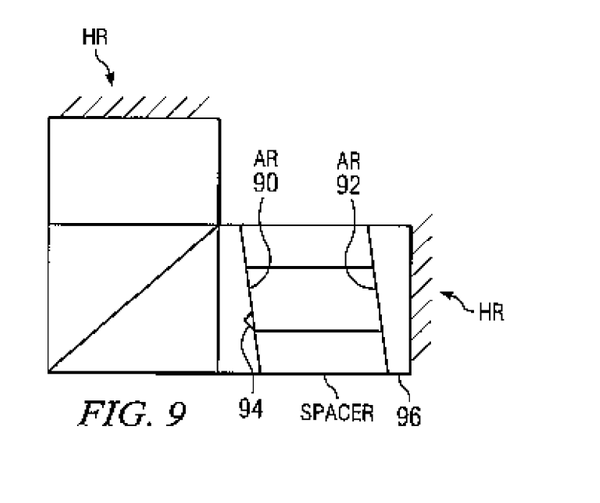
FIG. 9 shows a Michelson-based delay line interferometer with a second surface mirror in both paths and antireflection coatings on wedged optical elements in one arm.
Figure 10:
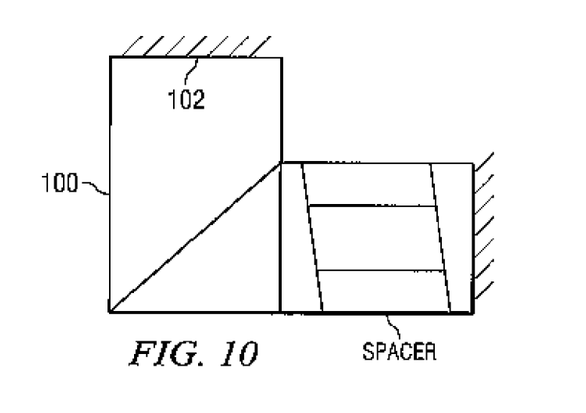
FIG. 10 shows a beamsplitter with an extended upper arm.

In order to reduce the thermal and dispersion issue that might be caused by the glass material, two arms should have the same length of glass, and hence their OPD comes mainly from the difference of the air path. This OPD is equal to a distance that is equivalent to the needed time delay. In a hermetically sealed condition, the length of the air path is affected by the spacer used. (Tunability can be provided by providing a gas within the hermetically sealed chamber and providing a mechanism, e.g., a vacuum/pressure pump to change the pressure within the chamber.) As shown in FIG. 7, the use of a zero thermal expansion material, such as Zerodur or ULE, as the spacer 60, the change in OPD can be minimized or reduced. Because the two beams experience the same glass path length, with the aid of the zero expansion spacer this design is athermal. Many variations can be derived from this design. For instance, by removing the pair of spacers from one arm, one can achieve the same functionality. This design has been discussed above with reference to FIG. 1. FIG. 8 shows an embodiment similar to FIG. 1 except that the mirror 80 in the right arm is located on the back surface of optical element 82. FIG. 9 is similar to FIG. 8 except that it includes antireflection coatings 90 and 92 on wedged optical elements 94 and 96, respectively. The wedges and AR coatings prevent reflections from those surfaces. In FIG. 9, the right arm has wedged optical elements with antireflection coatings on them. Note that the upper arm can be constructed with the same antireflection wedges. FIG. 10 provides a beamsplitter 100 with an extended upper arm and a mirror coating 102. The right arm of this embodiment is identical to that of FIG. 9.

BACKGROUND

Figure 11:
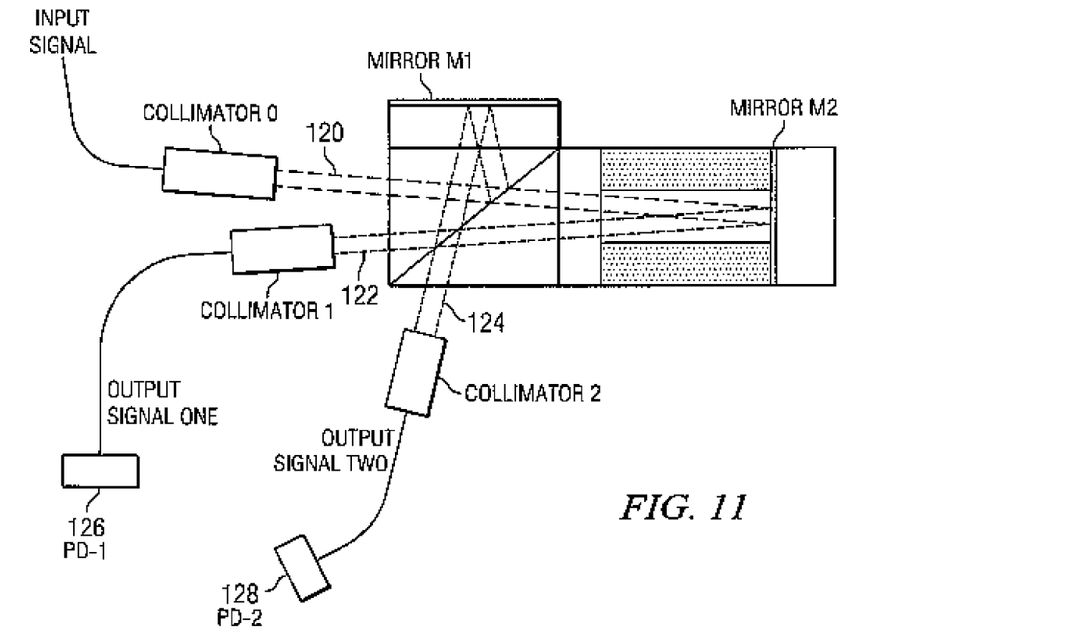
FIG. 11 shows a Michelson DLI with two output ports fiber coupled to photodetectors.

FIG. 11 shows a Michelson DLI that is a 3 port device having one input 120 and two outputs 122 and 124. Typically, all three ports are fiber coupled. The light of the two output ports are each connected to a photo detector (126, 128), which converts the optical signals into electronic signals.

Figure 12:
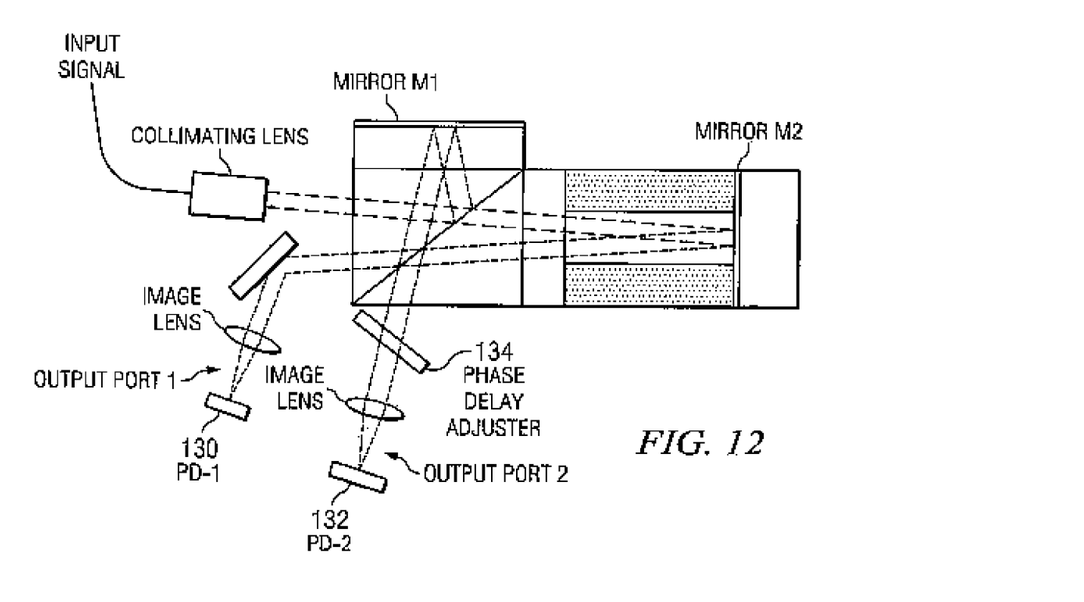
FIG. 12 shows a Michelson DLI with outputs directly coupled to photo detectors.

FIG. 12 shows an embodiment of the present invention that integrates the DPSK demodulator with a pair of photo detectors. In other words, instead of coupling the two output signals into fibers, the two output light signals are sent to the photo-detectors (130, 132) directly. Since the optical path lengths from the input port to the two output ports have to be almost identical, in one of the optical paths there is a phase delay adjuster 134. To adjust the optical path length, one can vary the thickness of the flat or the incident angle to the plate. This approach is advantageous because the size and cost of the receiver can be reduced significantly. Further, the coupling loss to the detector is smaller than to the fiber, thereby reducing the insertion loss of the receiver.

Figure 13:
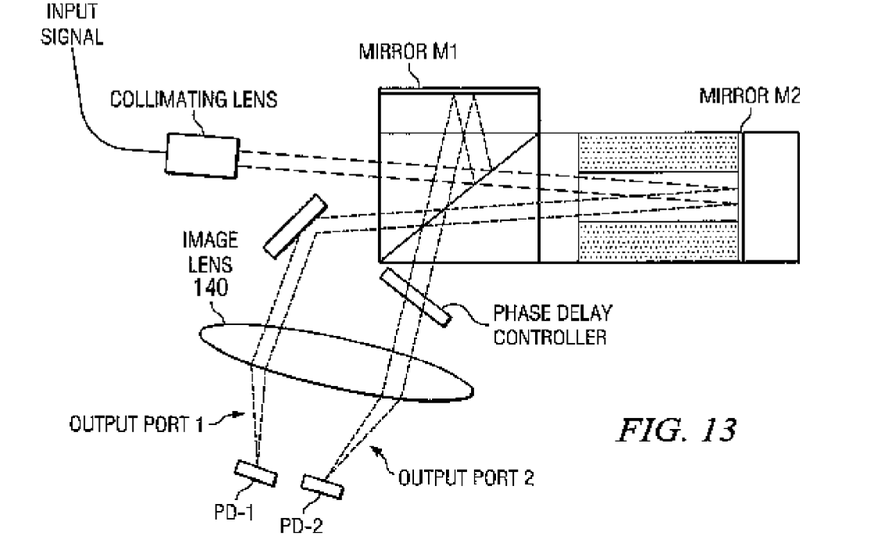
FIG. 13 shows a Michelson DLI that uses a single lens to directly couple the DLI outputs to photo detectors.

FIG. 13 shows a design that is similar to that of FIG. 12, but with two detectors that share one lens 140. This configuration allows the two detectors to be very close to each other.

Figure 14:
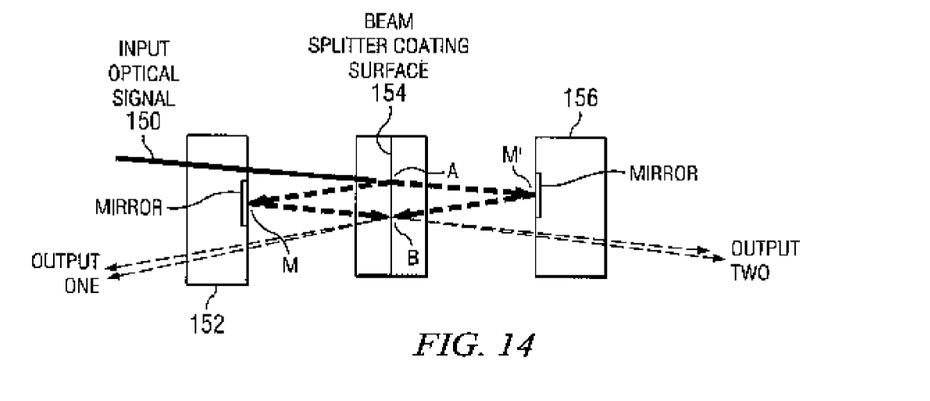
FIG. 14 shows another embodiment utilizing near normal incidence.

FIG. 14 shows another embodiment utilizing near normal incidence. The optical path length difference of AMB and AM'B is equal to speed of light multiplied by the time duration of two adjacent bits. In the figure, input beam 150 passes through optical flat 152, and is split at point A of beam splitter coating 154. One of the split beams is then reflected from mirror coating M on optical flat 152, and the other beam is reflected from M', which is a coating on a second optical flat 156. The beams are recombined at point B of beam splitter coating 154 to form two output channels 158 and 160. In this case, each output channel includes two beams. The optical path difference between the two spit beams can be changed by changing the distance from coating M to beam splitter coating 154 relative to the distance from coating M' to beam splitter coating 154. Alternate methods for varying the phase of the two split beams can be used, e.g., a phase adjusting optic such as used in FIG. 12 can be inserted in one of the split beams. Other methods will be apparent to those skilled in the art based on this disclosure.

The foregoing description of the invention has been presented for purposes of illustration and description and is not intended to be exhaustive or to limit the invention to the precise form disclosed. Many modifications and variations are possible in light of the above teaching. For example, for use in QDPSK embodiments, the invention can be designed to identify phase changes of 0, 90, 180 and 270 degrees. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An interferometric method comprising the steps of:
   splitting, at a splitting location, an input light beam into a first beam and a second beam;
   recombining, at a recombination location, said first beam and said second beam to produce at least one output beam, wherein said first beam will travel a first optical path length (OPL) from said splitting location to said recombination location, wherein said second beam will travel a second OPL from said splitting location to said recombination location, wherein when said input light beam carries phase modulated data with a fixed time interval between two adjacent data symbols, then the difference in optical path lengths between said first OPL and said second OPL is about equal to said time interval multiplied by the speed of light; and
   detecting each said output beam with a photodetector;
   wherein said at least one output beam is coupled into said photodetector without at least one fiber optic between said recombination location and said photodetector; and
   wherein at least one lens is operatively positioned between said recombination location and said photodetector.

2. The method of claim 1, wherein said step of splitting comprises the use of a non-polarizing beamsplitter (NPB).

3. The method of claim 1, wherein said steps of splitting and recombining comprise the use of one beamsplitter each.

4. An interferometric method comprising the steps of:
   splitting, at a splitting location, an input light beam into a first beam and a second beam;
   recombining, at a recombination location, said first beam and said second beam to produce at least one output beam, wherein said first beam will travel a first optical path length (OPL) from said splitting location to said recombination location; wherein said second beam will travel a second OPL from said splitting location to said recombination location, wherein when said input light beam carries phase modulated data with a fixed time interval between two adjacent data symbols, then the difference in optical path lengths between said first OPL and said second OPL is about equal to said time interval multiplied by the speed of light; and
   detecting each said output beam with a photodetector;
   wherein said at least one output beam comprises a first output beam and a second output beam, and said interferometric method further comprises the step of adjusting the phase of one of said first output beam or said second output beam.

5. An interferometric method comprising the steps of:
   splitting, at a splitting location, an input light beam into a first beam and a second beam;
   recombining, at a recombination location, said first beam and said second beam to produce at least one output beam, wherein said first beam will travel a first optical path length (OPL) from said splitting location to said recombination location, wherein said second beam will travel a second OPL from said splitting location to said recombination location, wherein when said input light beam carries phase modulated data with a fixed time interval between two adjacent data symbols, then the difference in optical path lengths between said first OPL and said second OPL is about equal to said time interval multiplied by the speed of light; and
   detecting each said output beam with a photodetector;
   wherein said interferometric method includes using a first optic comprising a first portion that is transparent to a wavelength of interest and a second portion that is reflective to said wavelength, a beam splitter with a beam splitter coating, and a second optic comprising a third portion that is transparent to said wavelength and a fourth portion that is reflective to said wavelength, and wherein said beam splitter coating is utilized for both said steps of splitting and recombining.

6. An interferometric method comprising the steps of:
   splitting, at a splitting location, an input light beam into a first beam and a second beam;
   recombining, at a recombination location, said first beam and said second beam to produce at least one output beam, wherein said first beam will travel a first optical path length (OPL) from said splitting location to said recombination location, wherein said second beam will travel a second OPL from said splitting location to said recombination location, wherein when said input light beam carries phase modulated data with a fixed time interval between two adjacent data symbols, then the difference in optical path lengths between said first OPL and said second OPL is about equal to said time interval multiplied by the speed of light; and
   detecting each said output beam with a photodetector;
   wherein said step of recombining includes the use of a first reflector positioned to reflect said first beam and the use of a second reflector positioned to reflect said second beam.

7. The interferometric method of claim 6, wherein one of said first reflector and said second reflector is separated from said splitting location by a distance sufficient to make the difference in optical path lengths between said first OPL and said second OPL to be about equal to said time interval multiplied by the speed of light.

8. The interferometric method of claim 6, wherein one of said first reflector and said second reflector is separated with at least one spacer from said splitting location by a distance sufficient to make the difference in optical path lengths between said first OPL and said second OPL to be about equal to said time interval multiplied by the speed of light.

9. The interferometric method of claim 8, wherein said at least one spacer comprises a material having a low coefficient of thermal expansion (CTE).

10. The interferometer of claim 8, wherein said at least one spacer comprises a material having a high coefficient of thermal expansion.

11. The interferometer of claim 6, wherein one of said first reflector and said second reflector is a separated reflector that is separated from said splitting location by a distance sufficient to make the difference in optical path lengths between said first OPL and said second OPL to be about equal to said time interval multiplied by the speed of light, and wherein said separated reflector is fixedly attached to a means for adjusting said distance.

12. The interferometric method of claim 6, further comprising a thermally tunable phase modulator for adjusting the optical path length of said first OPL or said second OPL.

13. The interferometric method of claim 6, wherein said first reflector comprises a reflective coating, and wherein said second reflector comprises a reflective coating.

* * * * *

UNITED STATES PATENT AND TRADEMARK OFFICE
CERTIFICATE OF CORRECTION

| | | |
|---|---|---|
| PATENT NO. | : 7,808,715 B2 | Page 1 of 1 |
| APPLICATION NO. | : 12/401616 | |
| DATED | : October 5, 2010 | |
| INVENTOR(S) | : Yung-Chieh Hsieh | |

It is certified that error appears in the above-identified patent and that said Letters Patent is hereby corrected as shown below:

Column 8, line 48, cancel "interferometer" and insert --interferometric method--.

Column 8, line 51, cancel "interferometer" and insert --interferometric method--.

Column 8, line 62, cancel "interferometic" and insert --interferometric--.

Signed and Sealed this
Fourth Day of January, 2011

David J. Kappos
*Director of the United States Patent and Trademark Office*